United States Patent [19]

Glowczewski et al.

[11] Patent Number: 5,760,355

[45] Date of Patent: Jun. 2, 1998

[54] ELECTRIC SWITCH FOR OPERATING A WINDSHIELD WIPER AND WASHER APPARATUS OF A MOTOR VEHICLE

[75] Inventors: David A. Glowczewski, Washington; Roger G. Bredernitz, Waterford, both of Mich.

[73] Assignee: ITT Manufacturing Enterprises, Inc., Wilmington, Del.

[21] Appl. No.: 815,152

[22] Filed: Mar. 11, 1997

[51] Int. Cl.⁶ ................................................ H01H 25/00
[52] U.S. Cl. ........................................................ 200/61.54
[58] Field of Search ........................... 200/4, 61.27, 61.3, 200/61.31, 61.54, 17 R, 18

[56] References Cited

U.S. PATENT DOCUMENTS

| | | | |
|---|---|---|---|
| 3,793,491 | 2/1974 | Cryer | 200/18 |
| 3,892,932 | 7/1975 | Erdelitsch et al. | 200/61.27 |
| 4,129,757 | 12/1978 | Cryer | 200/4 |
| 4,149,048 | 4/1979 | Winter et al. | 200/61.54 |
| 4,238,650 | 12/1980 | Cryer et al. | 200/4 |
| 4,273,971 | 6/1981 | Tregurtha | 200/4 |
| 4,293,743 | 10/1981 | Iwata et al. | 200/4 |
| 4,328,431 | 5/1982 | Usami | 307/10 R |
| 4,376,236 | 3/1983 | Long et al. | 200/61.27 |
| 4,376,237 | 3/1983 | Long | 200/61.27 |
| 4,393,280 | 7/1983 | Iwata et al. | 200/4 |
| 4,414,442 | 11/1983 | Berginski et al. | 200/61.27 |
| 4,678,875 | 7/1987 | Erdelitsch et al. | 200/61.54 |
| 4,791,253 | 12/1988 | Erdelitsch et al. | 200/61.27 |
| 4,810,839 | 3/1989 | Chretien | 200/4 |
| 4,882,457 | 11/1989 | Erdelitsch et al. | 200/61.54 |
| 4,920,239 | 4/1990 | Buhler et al. | 200/61.54 |
| 5,120,914 | 6/1992 | Kerner et al. | 200/61.54 |
| 5,182,422 | 1/1993 | Botz et al. | 200/61.54 |
| 5,182,423 | 1/1993 | Botz et al. | 200/61.54 |
| 5,196,662 | 3/1993 | Hofmann | 200/61.54 |
| 5,200,584 | 4/1993 | Nagaya | 200/4 |
| 5,440,085 | 8/1995 | Suzuki et al. | 200/61.54 |

FOREIGN PATENT DOCUMENTS

| | | | |
|---|---|---|---|
| 231924 | 8/1987 | European Pat. Off. | B60R 1/42 |
| 297560 | 1/1989 | European Pat. Off. | C07K 5/06 |
| 2349886 | 4/1975 | Germany | H01H 25/00 |
| 3211672 | 10/1983 | Germany . | |
| 3304942 | 8/1984 | Germany | H01H 21/48 |

Primary Examiner—Michael L. Gellner
Assistant Examiner—Michael A. Friedhofer
Attorney, Agent, or Firm—Thomas N. Twomey; J. Gordon Lewis

[57] ABSTRACT

An electric switch for operating a windshield wiper and washer apparatus of a motor vehicle has a housing in which a switching member for operating the wipers in a selected operation mode is swivelably mounted from a neutral position around a first axis to at least one operational position and a switch lever which, for operating the washer from a neutral position into an operational position, is swivelably mounted on the switching member around a second axis preferably perpendicularly intersecting the first axis. By a single actuation, it is possible by switching on the washer to also switch on the wipers. Therefore, in the first neutral position of the switching member, the switch lever, when being swiveled around the second axis into an operation position, is compulsorily swivelable together with the switching member around the first axis to such an extent that, after release of the switch lever, the switch lever reaches, together with the switching member, slide into a second position of the switching member.

10 Claims, 3 Drawing Sheets

ELECTRIC SWITCH FOR OPERATING A WINDSHIELD WIPER AND WASHER APPARATUS OF A MOTOR VEHICLE

FIELD OF THE INVENTION

The invention, in general, relates to electric switches, and, more specifically, to electric switches for operating a windshield wiper and washer system of a motor vehicle.

Normally electric switches of this type comprise a switching member which is swivelably mounted around a first axis in a switch housing. For operating the wiper system, the switching member is brought out of a neutral position into one of several operational positions by a switch lever. A different operation mode of the wiper system is assigned to each operational position. Thus, the switch provides continual operation of the wipers with two different speeds, intermittent operation in which there is an interval between one or several wiping cycles, and mist wiping operation corresponding to an operational position of the switching member from which the switching member automatically returns into the neutral position after release of the switch lever.

In each of the switching positions of the switching member and the switch lever, defined with respect to the first axis, the switch lever can be swiveled with respect to the switching member around a second axis so that the windshield washer system of the motor vehicle is actuated to spray water onto the windshield. The switch lever, when swiveled around the second axis, acts directly upon a bridging contact movably held in the switch housing. A special situation exists when the switch lever is in the neutral or off position and the operator pivots the switch lever about the second axis to activate the wash cycle. Since it is necessary to wipe the windows during and shortly after the completion of the application of wash fluid to the windshield, such switches have been provided with means for automatically activating the wiper motor, usually at a low speed, simultaneously with swivelling of the switch lever about the second axis. A ramp and ramp glider have been provided in the switch housing to act on the switch lever when the switch lever is in the neutral position with respect to the first axis and swivelled about the second axis to urge the switch lever into an operational position usually corresponding to low speed wiper motor operation. The operator is required to manually swivel the switch lever to the off position to deactivate the wiper.

Despite the effectiveness of such switches, it is desirable to provide an electric switch suitable for use in operating a vehicle windshield wiper and washer system which offers further improvements in operability over previously devised windshield washer and wiper switches.

SUMMARY OF THE INVENTION

According to the present invention, the switch lever is mounted on the switching member around a second axis preferably perpendicularly intersecting a first axis of rotation of the switching member. For operating the washer, the switch lever is swivelled around the second axis from a neutral position to an operational position and automatically returns to the neutral position after being released in certain operational positions of the switching member.

According to the invention, the switch lever, starting off from a first position of the switching member, when being swivelled around the second axis into an operational position, is compulsorily swivelable, upon release of the switching member from the swivelled position, about the second axis together with the switching member around the first axis into a second operational position of the switching member. Thus, in the electric switch according to the invention it is possible by simply swiveling the switch lever around the second axis to simultaneously turn on the washer and to select an appropriate operation mode of the wipers.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
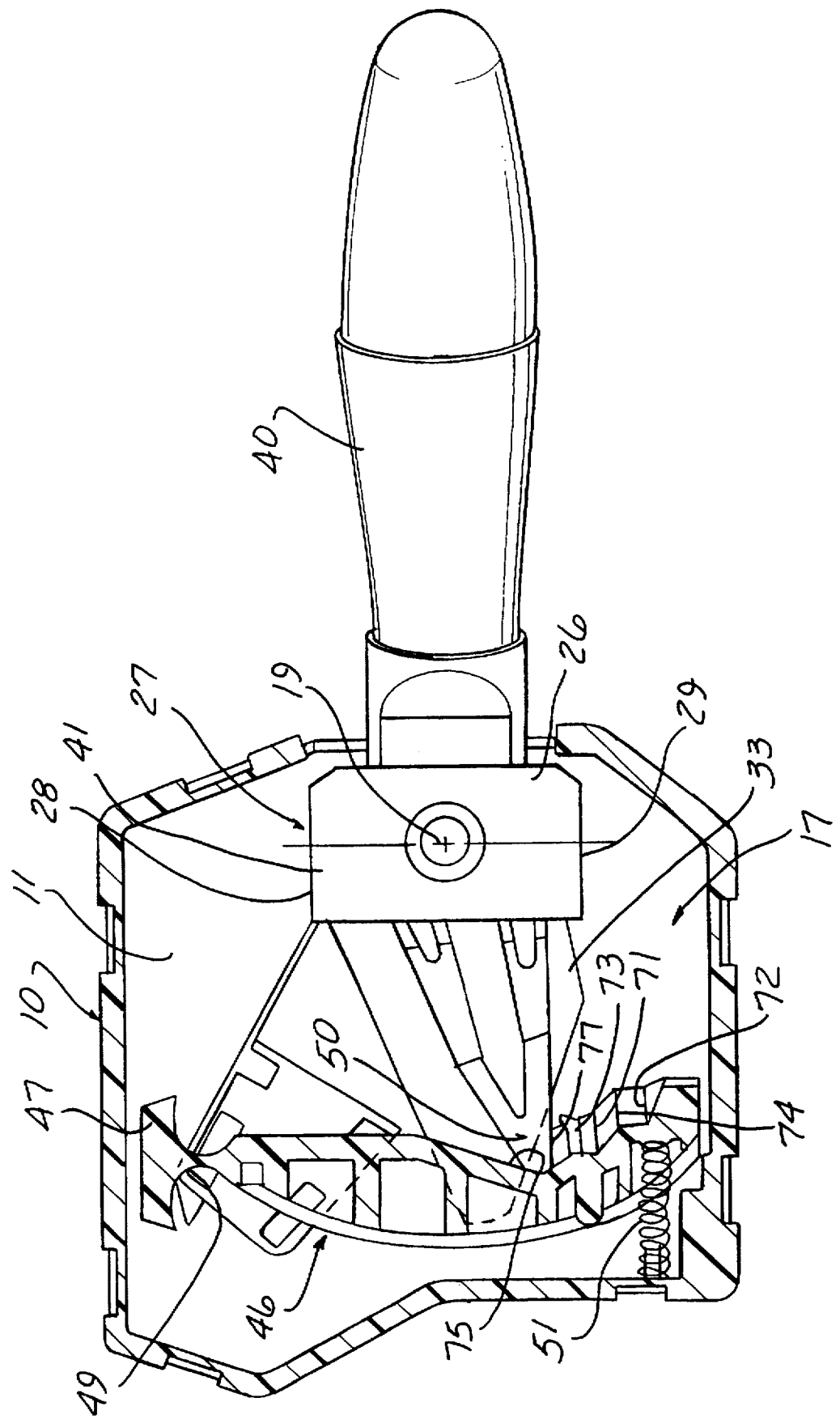
FIG. 1 is a plan view into the open switch housing in the direction of the swiveling axis of the switching member.

A switch housing 10 of the electric switch shown in FIGS. 1–5 consists of a base plate 11 and a top 12 which are locked by means of locking lugs 13 on the base plate 11 and apertures 14 on the top 12. The base plate 11 and the top 12 have aligning bearing bores 15 and 16 in which a switching member 17 with two bearing pins 18 is swivelably mounted around a first axis 19.

Figure 2:
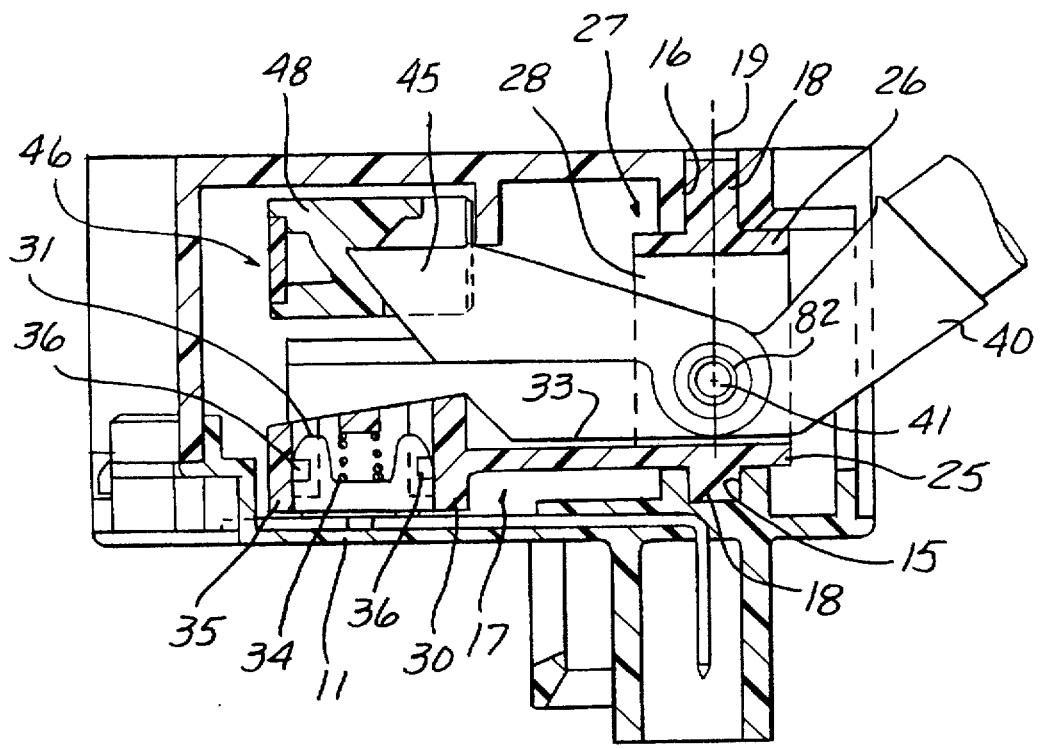
FIG. 2 is a cross sectional view taken along an intersecting plane parallel to the first axis.
Figure 3:
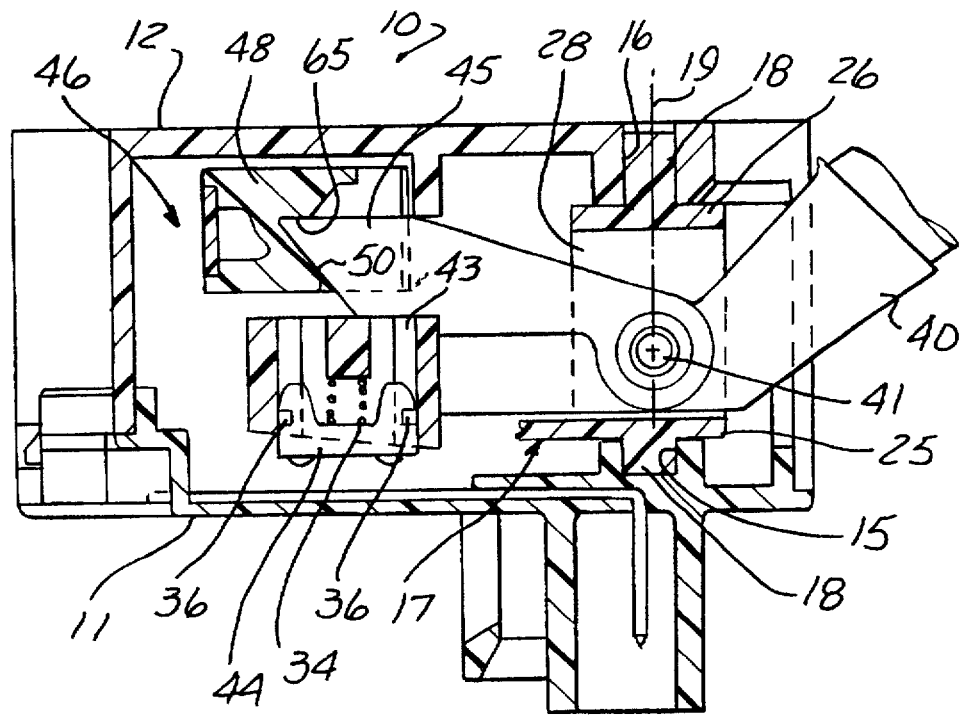
FIG. 3 is a cross sectional view taken along a different intersecting plane parallel to the first axis.

The two bearing pins 18, as shown in FIG. 3, are located outside on two parallel sides 25 and 26 of a frame-like section 27 of the switching member 17 which is completed by two further sides 28 and 29 perpendicular to the sides 25 and 26 and parallel to each other. A plate-like section 30 with a receiver 31 for a first bridging contact 32 is formed on the side 25 of the frame-like section 27. FIG. 3 shows that the plate-like section 30 of the switching member 17 is fixedly bound onto the frame-like section 27 by a rib 33 projecting from the wall 29 of the frame-like part 27 and steeply sloping from the side 26 of this section. The bridging contact 32 is pressed against the base plate 11 by a helical spring 34. FIGS. 2 and 3. Shoulders 35 in the receiver 31 and projections 36 on the bridging contact 32, however, prevent the bridging contact 32 from being completely pressed out of the receiver 31 by the helical spring 34 during assembly.

Figure 4:
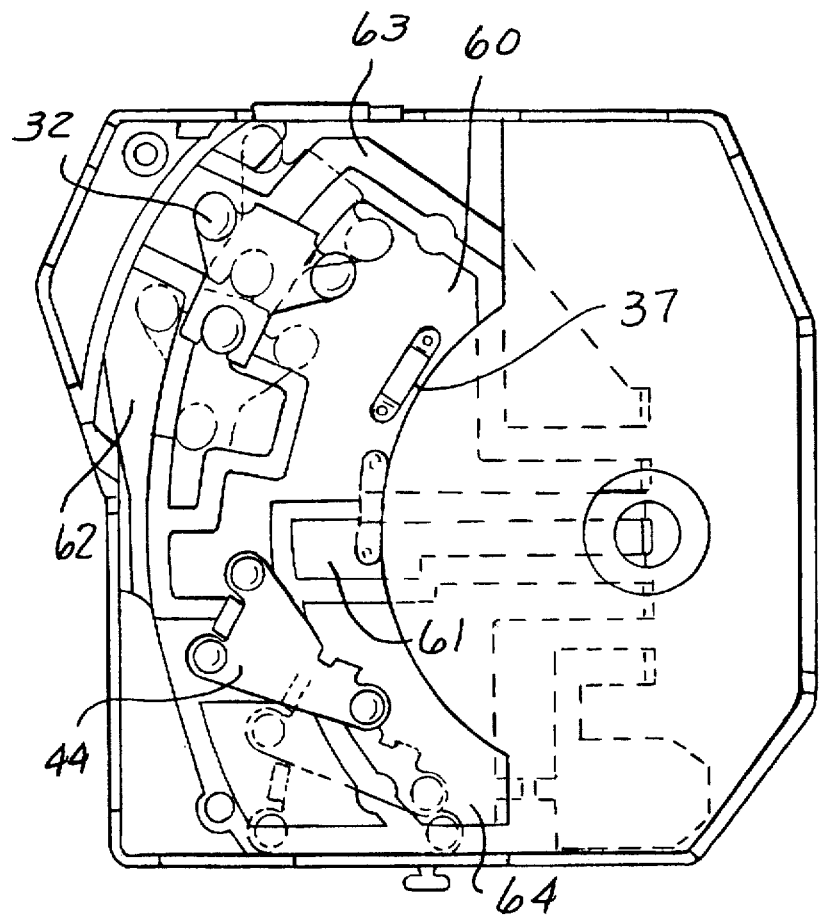
FIG. 4 is a plan view of a base plate provided with a lead frame.

In the frame-like section 27 of the switching member 17, a switch lever 40 illustrated in FIGS. 1–3 without a handle is mounted in such a way that it can be swivelled around a second axis 41 perpendicular to and intersecting the first axis 19. Within the switch housing 10, the switch lever 40 comprises an integral extension 42 with a receiver 43, which extension 42 protrudes from the side wall 28 of the switching member 17 and is located laterally to the section 30 of the switching member 17. In the receiver 43, a second bridging contact 44 is supported by means of a helical spring 34 and is mounted by means of shoulders 35 and projections 36 in the same way as the first bridging contact 32 in the receiver 31 of the switching member 17. Another bridging contact 37 is mounted on the plate-like extension 30 of the switching member 17 and is pressed against the base plate 11 by an internally mounted helical spring. In a preferred embodiment, first and second bridging contacts 32 and 34 are three-pad contacts as shown in FIG. 4. Third bridging contact 37 is a two-pad contact.

Above the plate-like section 30 of the switching member 17, the switch lever 40 includes a tappet 45 which lies on a locking lever 46, the one end 47 of which is fixed onto the top 12 of the switch housing 10 in a generally known way, not shown, but is known for instance from U.S. Pat. No. 4,791,253. The locking lever 46 includes a lever arm 48 which is connected with the end 47 via a film hinge 49 and has a catch or cam 50 for the tappet 45 of the switch lever 40, which tappet 45 acts as a cam glider. The catch 50 determines the different switching positions of the switching member 17 and the switch lever 40 with respect to the first axis 19. At the back opposite from the catch 50, the lever arm 48 is biasingly supported by a coil spring 51, one end of which is mounted about a post in the switch housing 10.

Figure 5:
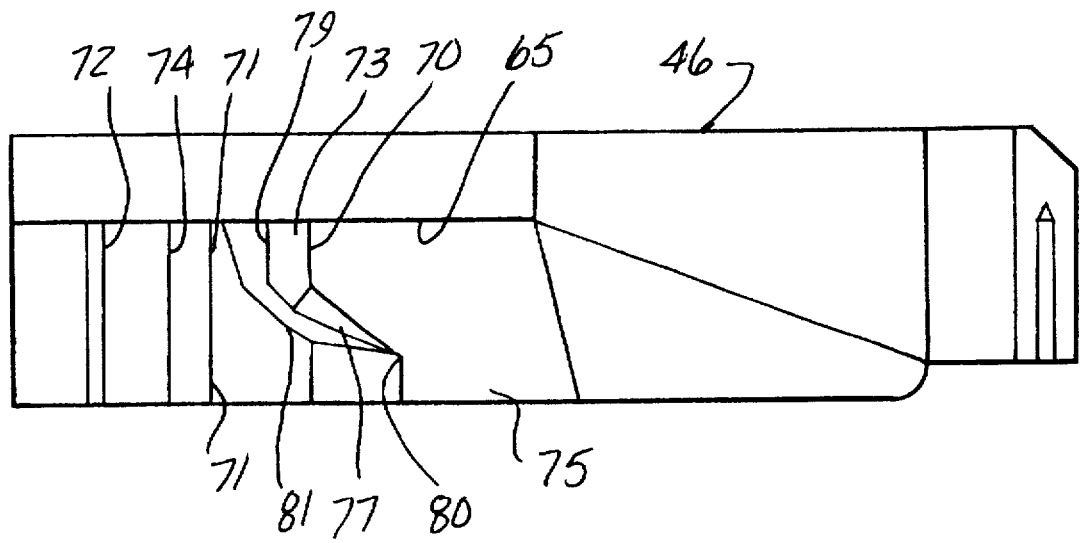
FIG. 5 is an outline of the cam and detent.

The catch 50, looked at in the swiveling direction around the first axis 19, includes three cavities 70, 71 and 72 as shown in FIG. 5, which are separated from each other by teeth 73 and 74, respectively. In the neutral or off position of the switching member 17, the tappet 45 is disposed in the cavity 70. Cavity 71 corresponds to a continual operation mode of the wiper system at low speed and cavity 72 corresponds to a continual operation mode of the wiper system at high speed. If the tappet 45 of the switch lever 40 is in one of the cavities 70, 71 or 72, the switching member 17 and the switch lever 40 remain in the position previously occupied, if no outer forces act upon them. The cavities 70, 71 and 72 define stable switching positions of the switching member 17 and the switch lever 40. Opposite the tooth 73 towards the other side there is a slope 75 next to the cavity 70, onto which slope 75 the tappet 45 of the switch lever 40 can be pushed, if the switch lever 40 and the switching member 17 are swivelled in a clockwise direction in FIG. 1 from the neutral position. The switching member 17 and the switch lever 40 automatically return from the switching position reached on the slope 75 into the neutral position when the switch lever 40 is released. The switching position on the slope 75 of the catch 50 corresponds to a mist wiping operation in which the wiper is actuated only as long as the switch lever 40 is held on the slope 75.

Five stationary contacts 60, 61, 62, 63 and 64 are arranged in a metallic lead frame on the base plate 11 and cooperate with the three bridging contacts 32, 33 and 44 as shown FIG. 4. In FIG. 4, the bridging contacts 32, 33 and 44 are indicated in solid lines in the positions which each occupies when the switching member 17 and the switch lever 40 are in the neutral position with respect to the axis 19 in which the wiper system of the motor vehicle is switched off. It can be seen that the longitudinal direction of the third bridging contact 37 is aligned with a radial direction with respect to the first axis 19. If the switch lever 40 is swivelled clockwise around the axis 19 according to the views illustrated in FIGS. 1 and 4, the switch lever 40 takes along the switching member 17 and the bridging contact 32, which, in the neutral position of the switching member 17 connects the two stationary contacts 60 and 63, and moves into a position indicated in phantom in FIG. 4 where it connects the two stationary contacts 60 and 62. If the switch is used for operating a wiper system of a motor vehicle, the bridging contact 32 connects electrical power through contacts 60 and 62 to rotate the motor of the wiper system at low speed. The tappet 45 of the switch lever 40 is shifted along the cam 50 on the slope 75. If the switch lever 40 is released again, the switch lever 40 and switching member 17 return into the neutral position due to the slope 75 of the cam 50.

When the switch lever 40 and the switching member 17 are swivelled counterclockwise from the neutral position, the bridging contact 32 again connects the two stationary contacts 60 and 62 at a different position. However, after being released, the switch lever 40 does not automatically return to the neutral position. Thus, the switch position corresponds to a continual operation of the wiper system at a low motor speed. If the switching lever 40 and the switching member 17 are further swiveled counterclockwise, the bridging contact 37 connects the two stationary contacts 60 and 61. In this position, the wiper system is operated at a higher electric motor speed.

The bridging contact 44 also moves with the swiveling movements of the switch lever 40 around the first axis 19. The different positions it occupies with respect to the axis 19 are indicated in phantom in FIG. 4.

FIG. 3 shows that the catch 50 does not run in parallel to the axis 19, but slopingly to it to such an extent that its distance from the axis 19 becomes smaller towards the base plate 11. Therefore the cam always swivels the switch lever 40 clockwise, according to FIGS. 2 and 3, to such an extent that the tappet 45 lies on a top 65 of the locking lever 46 extending along the cam 50. If the switch lever 40 is not swivelled around the second axis 41 by outer forces, the tappet 45 lies on the stop 65 and the bridging contact 44, as can be seen in FIG. 3, at a distance from the stationary contacts on the base plate 11. This applies to all switching positions of the switching member 17 and of the switch lever 40 with respect to the axis 19.

If the switch lever 40 is swivelled counterclockwise around the axis 41 from the neutral position shown in FIGS. 2 and 3, the bridging contact 44 acts upon the two stationary contacts 60 and 64. Due to the contact between the two stationary contacts 60 and 64, a washer system is actuated and a wash fluid is sprayed onto the windshield of the motor vehicle. This can be done in each switching position of the switching member 17. After releasing the switch lever 40, the switch lever 40 returns into the original neutral position due to the slope of the catch 50 and the spring 51.

However, a special condition has to be taken into consideration if the switching member 17 is in the neutral position.

In the illustrated electric switch, the aforementioned condition is taken care of by the switching member 17 and, also, the switch by forming the tooth 73 with a tip 77 which extends at an angle from the main or base portion of the tooth 73, as shown in FIG. 5. The tip 77 terminates in an end or edge 80 which is laterally offset from the main portion of the tooth 73. If the switch lever 40 is fully swivelled counterclockwise about the second axis 41, the tappet 45 will be urged along an inner edge of the tooth 73 and the tip 77 until it passes the end 80 of the tip 77. In this position, the bridging contact 44, shown in the solid lines, provides a three point connection between the power contact pad 60 and the low speed wiper motor contact 62 and the wash contact 64 to simultaneously wash and wipe the windshield.

When the switch lever 40 is released, the biasing force exerted by the spring 51 on the catch 50 will urge the tappet 45 along an outer surface of the tooth 73 and the tip 77 into the cavity 71. As described above, in this position, the first bridging contact 32 makes contact between contacts 62 and 60 thereby continuing the supply of electric power to the lower speed windings of the wiper motor to continue to activate the wiper motor at a low speed. This occurs simultaneously with the completion of the wash cycle thereby assuring that the windshield is completely wiped of wash fluid.

What is claimed is:

1. An electrical switch comprising:
    a housing;
    a switching member mounted in the housing for rotation about a first axis between first and second operating positions;

lever means mounted on the switching member for rotation about a second axis angularly offset from the first axis between first and second actuating positions; and engagement means, mounted on the housing and the lever means, for engaging the lever means and the switching member upon rotation of the lever means between the actuating positions, and displacing the switching member from the first operating position to the second operating position, the engagement means including:

a cam located on one of the lever means and the housing;

a cam glider located on the other of the housing and the lever means;

the cam having at least one tooth separating the first and second actuating positions of the lever means; and a tip end formed on the cam and projecting angularly from the at least one tooth to prevent the cam glider from sliding into the first actuating position adjacent the at least one tooth after release of the lever means from swivelling about the second axis.

2. The electric switch of claim 1 wherein:

the actuating positions of the lever means and the operating positions of the switching member with respect to the first axis, and the actuating positions of the lever means about the second axis are arranged such that the switching member, when the lever means is swivelled about the second axis from the first actuating position to the second actuating position, is compulsorily swivelable about a predetermined angle about the first axis, wherein the switching member and the lever means, after release of the switch lever to the first actuating position automatically swivel into the second operating position of the switching member.

3. The electrical switch of claim 1 further comprising:

an array of fixed electrically isolated contact pads;

a first bridging contact carried by the switching member and positioned to overlay a varying plurality of the contact pads in each operating position of the switching member to establish a uniquely electrically conductive path for each of the operating positions;

a second bridging contact carried by the lever means and positioned to overlay a fixed plurality of the contact pads to establish an open conductive path therebetween when the lever means is in the first actuating position and a closed conductive path therebetween when the lever means is in the second actuating position; and a third bridging contact carried by the switching member and positioned to overlay a varying number of the contact pads in at least one of the first and second operating positions of the switching member to establish a unique electrically conductive path for each of the operating positions.

4. The electrical switch of claim 1 wherein the tip end is integrally formed as a continuous extension of the at least one tooth.

5. The electrical switch of claim 4 wherein the at least one tooth has a first side edge forming a cavity defining the first operating position of the switching member;

the tip end having a side edge contiguous with and angularly offset from the first side edge of the at least one tooth;

biasing means, mounted in the housing and acting on the cam, for biasing the cam toward the switching member such that swivelling of the switching member about the first axis and along the first side edge and the side edge of the tip end will urge the switching member around the tip end as the switching member approaches an end limit of swivelling about the first axis.

6. An electrical switch comprising:

a housing for operating a windshield wiper and washer apparatus;

a switching member mounted in the housing for rotation about a first axis between a neutral position and at least one operating position to operate the wiper;

lever means mounted on the switching member for rotation about a second axis angularly offset from the first axis between first and second actuating positions to operate the washer; and engagement means, mounted on the housing and the lever means, for engaging the lever means and the switching member upon rotation of the lever means between the actuating positions, and displacing the switching member from the neutral position to the at least one operating position, the engagement means including:

a cam located on one of the lever means and the housing;

a cam glider located on the other of the housing and the lever means;

the cam having at least one tooth separating the first and second actuating positions of the lever means; and a tip end formed on the cam and projecting angularly from the at least one tooth to prevent the cam glider from sliding into the first position adjacent the at least one tooth after release of the lever means from swivelling about the second axis.

7. The electric switch of claim 6 wherein:

the actuating positions of the lever means and the operating positions of the switching member with respect to the first axis, and the actuating positions of the lever means about the second axis are arranged such that the switching member, when the lever means is swivelled about the second axis from the first actuating position to the second actuating position, is compulsorily swivelable about a predetermined angle about the first axis, wherein the switching member and the lever means, after release of the switch lever to the first actuating position automatically swivel into the at least one operating position of the switching member.

8. The electrical switch of claim 6 further comprising:

an array of fixed electrically isolated contact pads;

a first bridging contact carried by the switching member and positioned to overlay a varying plurality of the contact pads in each of the operating positions of the switching member to establish a uniquely electrically conductive path for each of the operating positions of the switching member;

a second bridging contact carried by the lever means and positioned to overlay a fixed plurality of the contact pads to establish an open conductive path therebetween when the lever means is in the first actuating position and a closed conductive path therebetween when the lever means is in the second actuating position; and a third bridging contact carried by the switching member and positioned to overlay a varying number of the contact pads in at least two of the operating positions of the switching member to establish a unique electrically conductive path for each of the at least two operating positions on the switching member.

9. The electrical switch of claim 8 wherein the tip end is integrally formed as a continuous extension of the at least one tooth.

10. The electrical switch of claim 9 wherein the at least one tooth has a first side edge forming a cavity defining the first operating position of the switching member;

the tip end having a side edge contiguous with and angularly offset from the first side edge of the at least one tooth;

biasing means, mounted in the housing and acting on the cam, for biasing the cam toward the switching member such that swivelling of the switching member about the first axis and along the first side edge and the side edge of the tip end will urge the switching member around the tip end as the switching member approaches an end limit of swivelling about the first axis.

* * * * *